(12) United States Patent
Cao (10) Patent No.: US 6,910,025 B2
(45) Date of Patent: Jun. 21, 2005

(54) MODELING BEHAVIOR OF AN ELECTRICAL CIRCUIT

(75) Inventor: Lipeng Cao, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 430 days.

(21) Appl. No.: 09/989,325

(22) Filed: Nov. 20, 2001

(65) Prior Publication Data

US 2003/0097348 A1 May 22, 2003

(51) Int. Cl.[7] ............................................. G06F 15/18
(52) U.S. Cl. ...................................................... 706/15
(58) Field of Search .......................................... 706/15

(56) References Cited

U.S. PATENT DOCUMENTS

| | | | | |
|---|---|---|---|---|
| 5,004,932 A | * | 4/1991 | Nejime .......................... | 706/12 |
| 5,668,732 A | | 9/1997 | Khouja et al. ................ | 702/60 |
| 5,673,366 A | * | 9/1997 | Maynard et al. .............. | 706/14 |
| 5,682,320 A | | 10/1997 | Khouja et al. ................. | 716/4 |
| 5,696,694 A | | 12/1997 | Khouja et al. ................. | 716/5 |
| 6,075,932 A | | 6/2000 | Khouja et al. ................. | 716/4 |
| 6,763,263 B2 | * | 7/2004 | Gregory et al. ............... | 600/547 |

OTHER PUBLICATIONS

Peter B.L. Meijer, "Neural Networks for Device and Circuit Modelling", www.seeingwithsound.com/thesis/scee2000_meijer.pdf, 2000.*

CA Details Neural Agent for Predictive Management, www.tgc.com/dsstar/98/0818/100262.html, Aug. 18, 1998.*

Cincotti et al, "A Neural Network Model of Parametric Non–linear Hysteretic Inductors" IEEE Transaction on Magnetics, Sep. 1998.*

Luo Fa–Long, Bound on Inputs to Neurons, of Hopfield, Continuous–Variable Neural Network IEE proceedings of Circuits, Devices and Systems, Dec. 1991.*

Wang, "Efficient Generation of Timing and Power Polynomial Models from Lookup Tables for SoC Designs," IEEE, pp. 216–220 (1999).

* cited by examiner

Primary Examiner—George Davis
(74) Attorney, Agent, or Firm—James L. Clingan, Jr.; Susan C. Hill (57) ABSTRACT

Behavior of an electrical circuit can be modeled using a trained neural network. For example, using one or more neural networks, power consumption, including leakage power and switching energy, can be estimated. Also, a profile of current versus time can be generated for the electrical circuit. A hierarchy of neural networks may be used to model the circuit at different levels. In one embodiment, a circuit behavior is modeled using one or more neural networks, cluster values, and cluster probabilities.

18 Claims, 5 Drawing Sheets

MODELING BEHAVIOR OF AN ELECTRICAL CIRCUIT

BACKGROUND OF THE INVENTION

1. Field of the Invention

This invention relates to tools for analyzing circuits, and more particularly, to modeling behavior of an electrical circuit.

2. Related Art

Modeling of circuits is an important part of the process of bringing an integrated circuit from a concept to an actual product. Modeling provides a much faster and cheaper way to verify that a design actually does what is intended. This includes all aspects of the operation of the circuit, not just that the circuit performs the intended analog or logic function. Power consumption, for example, is becoming one of the most important factors in the design of VLSI systems in recent years due to increased integration level and higher clock frequency. Integrated circuits with high power consumption levels have stringent requirements on heat removal and management of di/dt noise. High current consumption also shortens battery life of portable electronics. Detailed and accurate power analysis on a clock cycle by clock cycle basis is therefore imperative not only to quantify the requirements of heat removal and di/dt noise management, but also to provide a blueprint for opportunities of reducing power consumption and mitigating di/dt noise in a circuit design. Thus it is important to be effective in modeling power consumption.

Power consumption can be estimated at high-level, gate-level, and transistor-level with a trade-off between estimation accuracy and simulation speed. Power estimation on a clock cycle by clock cycle basis is normally only feasible by using the gate-level or transistor-level approach. The transistor-level method provides better accuracy, but its requirement of a relatively long simulation time prevents it from being used to study a large number of test vector sequences in a large and complex design, e.g., a microprocessor. In the gate-level method, switching activities beyond gates are captured by behavioral simulation. This provides much better simulation speed. Cycle-by-cycle power consumption resulting from the charging and discharging of capacitors of interconnects and gates' inputs can be easily evaluated. On the other hand, the power consumption internal to gates needs to be pre-characterized under different steady state and switching conditions. Power estimation accuracy of the gate-level method depends on how well the power consumption of gates is characterized.

Accordingly there is a need for a tool for improving estimation accuracy and speed of power consumption of an integrated circuit.

DESCRIPTION OF THE INVENTION

A trained neural network (neural net) is used to model a circuit characteristic. Actual power consumption is calculated for a limited number of input possibilities. Techniques for determining this power consumption are typically relatively slow. This power consumption data is then used to train the neural net as well as verify that the neural net was trained properly. The trained neural net then may receive any input possibility as part of an event driven model that may be much faster than the model type required for providing the power consumption information. The trained neural net then is used to relatively quickly provide power consumption probabilities from which a power estimation can be relatively accurately derived for any input possibility. The invention may be better understood by reference to the drawings and the following description of the drawings.

Figure 1:
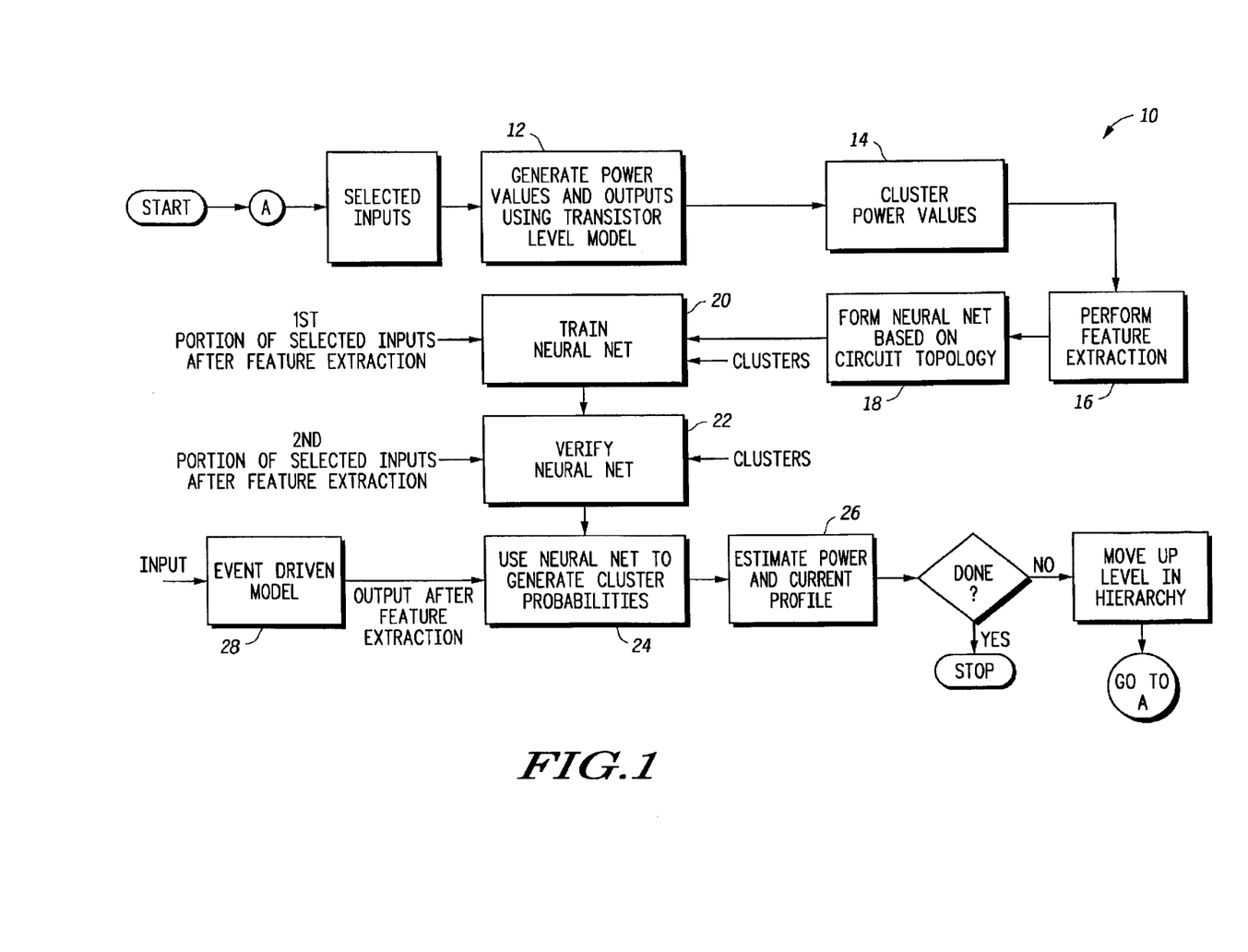
FIG. 1 is a flow diagram showing a method according to an embodiment of the invention.
Figure 2:
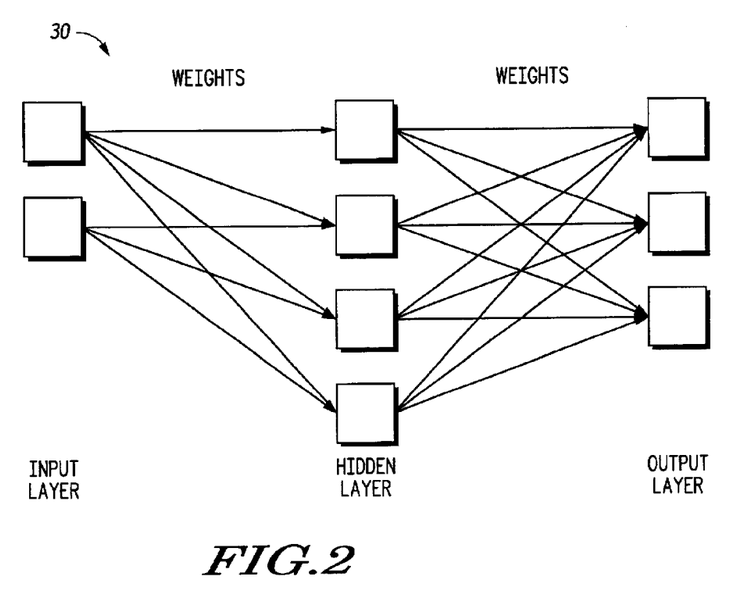
FIG. 2 is a block diagram of a neural network useful in performing the method shown in FIG. 1.

Shown in FIG. 1 is a method 10 for estimating power consumption of a circuit comprising steps 12, 14, 16, 18, 20, 22, 24, and 26 and an event driven model 28. Shown in FIG. 2 is a neural network (neural net) 30 useful in the method of FIG. 1. The method begins by a designed circuit being provided that needs power estimation for its different input-possibilities. At the very start and as shown in step 12, a non-neural network model, which may be a transistor level model, is used to determine the power consumption for a limited number of input possibilities. The number of total input possibilities for even a relatively simple circuit such as a 16 input adder may be in the range of four billion possibilities. The limited number of calculated inputs used in calculating power consumption may be several thousand. Acquiring power consumption results for a thousand calculated inputs may require even a week or longer. The result of the calculations is a power value, which is the power that is consumed for the particular calculated input that is correlated to the calculated inputs.

The power values are then clustered into groups that have substantially the same power value as shown in step 14. After the different clusters have been formed, a feature extraction, which is described in more detail elsewhere herein, is performed that is in preparation for training the neural net 30 as shown in step 16. The feature extraction is for providing a more efficient neural net and is based on circuit topology as shown in step 18. The neural net is trained by running a first portion of the calculated inputs and their correlated power values through the neural net 30 as shown in step 20. The first portion is generally 80% of the total. The training of the neural net 30 is verified using a second portion of the calculated inputs as shown in step 22. In both steps 20 and 22, feature extraction is performed on the calculated inputs prior to training and verifying the neural net 30. In this approach, the second portion is remaining 20% of the calculated inputs. The result is a trained neural net, that has been verified, that can then be used for providing power estimates for all input possibilities.

In preparation for use of the trained neural net, typical input data would first come through event driven model 28 and would also have feature extraction performed thereon. The input data is received by the trained neural net as shown in step 24. The neural net responds by providing the probabilities for each cluster that that cluster was the one that represented the power consumed for that particular data input. From these probabilities the actual power consumed is estimated as shown in step 26. The output of the trained neural net provides not just power information, but also timing information with respect to the power consumed. The power is based on current flow, and thus there is available a current profile in which current may be plotted against time.

In this example, the initial designed circuit was assumed to be a circuit such as an adder that was modeled at the transistor level. A circuit can actually be very simple, such as a single transistor, complex as a completed integrated circuit. A relatively complex integrated circuit, such as a microcomputer, will have a variety of circuits with complexity comparable to an adder. A relatively complex circuit portion, such an arithmetic logic unit (ALU), is made up of many such sub-circuits. In such a case, trained neural nets for each such sub-circuit that makes up the ALU can be used to generate another trained neural net for the ALU itself using substantially the same process as for the method shown in FIG. 1. In such case the calculated inputs would be achieved using the sub-circuit trained neural nets to generate power values based on input data. Thus, the equivalent of step 12 would be summing up the outputs of all the sub-circuit neural nets for a given calculated input to the ALU. This would be achieved using relatively high speed modeling. The initial neural nets are trained using calculated inputs from the relatively slow transistor models. After all of the circuit types that make up the integrated circuit have a trained neural net, the relatively slow model is no longer needed. Thus, every circuit type that makes up the particular integrated circuit has a trained neural net from which a trained neural net for each block may be obtained. A step up in complexity can be continued until there is a trained neural net for the entire integrated circuit.

Thus, as shown in FIG. 1, the entire process is considered "done" after a trained neural net has been provided for the whole integrated circuit. If there are still multiple trained neural nets that are for portions of the integrated circuit, then the next step is viewed as moving up a level in hierarchy. An example of the move up in hierarchy is going from the level in which an adder is an example to a higher level in which an ALU is an example. Any one or more of the neural nets may also be independently useful. Less than a neural net for the whole integrated circuit may be highly useful.

This method recognizes that leakage power and internal switching energy of a circuit observe certain statistical distribution properties that are unique to the circuit. The values of leakage power and switching energy can vary by orders of magnitude from one state/transition to another. At the same time, many states have similar leakage power, and many transitions have similar switching energy. A limited few average values of a circuit's leakage power and switching energy can be derived from clustering its spectrum of leakage power and switching energy collected from a transistor level simulation of a randomly generated test vector sequence for efficient table-lookup of the circuit's power consumption. It is beneficial to partition (classify) the entire state and transition space of the circuit with respect to these few limited average values. A mechanism is provided to map each one of the possible states to one of the leakage power average values, and map each one of the possible transitions to one of the average switching energy values in such a way that the power estimation error is minimized.

Figure 3:
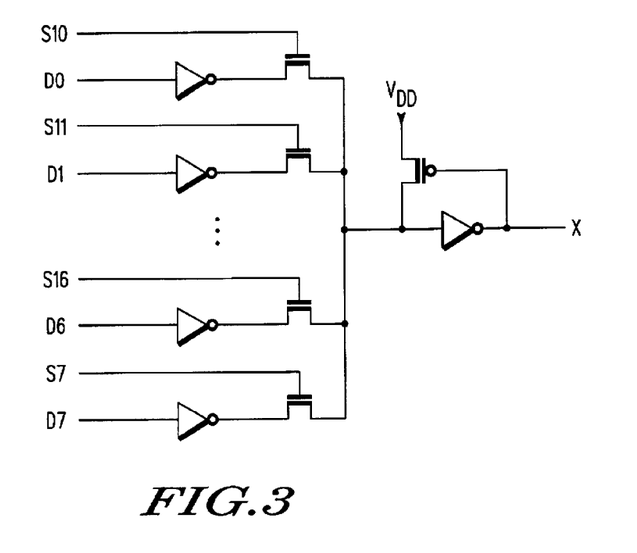
FIG. 3 is a circuit diagram of an exemplary circuit for using the method of FIG. 1.

A more detailed explanation of the theory of operation follows. The Bayesian inference, which is described in more detail elsewhere herein, is useful in the partitioning issue. Illustrated are the key concepts of Bayesian inference and its application to circuit power estimation using the example of estimating the internal switching power of the 8-to-1 Mux circuit shown in FIG. 3. The procedure for estimating circuit leakage power is very similar.

Bayesian inference is based on Bayes' theorem:

$$P(C_k \mid x) = \frac{P(x \mid C_k) \cdot P(C_k)}{P(x)}$$

Here, $C_k$ denotes a class k, which represents a specific average power value. x is a feature vector that characterizes the states and transitions of a circuit. P(x) is the prior probability. This is the probability that x occurs, and it functions as a normalization factor. $P(C_k)$ is the prior probability that the average power value identified by $C_k$ is used. $P(x|C_k)$ is the conditional probability. This is the probability that x occurs, given that $C_k$ occurs. $P(C_k|x)$ is the posterior probability. This is the probability that $C_k$ occurs, given that x occurs.

Figure 4:
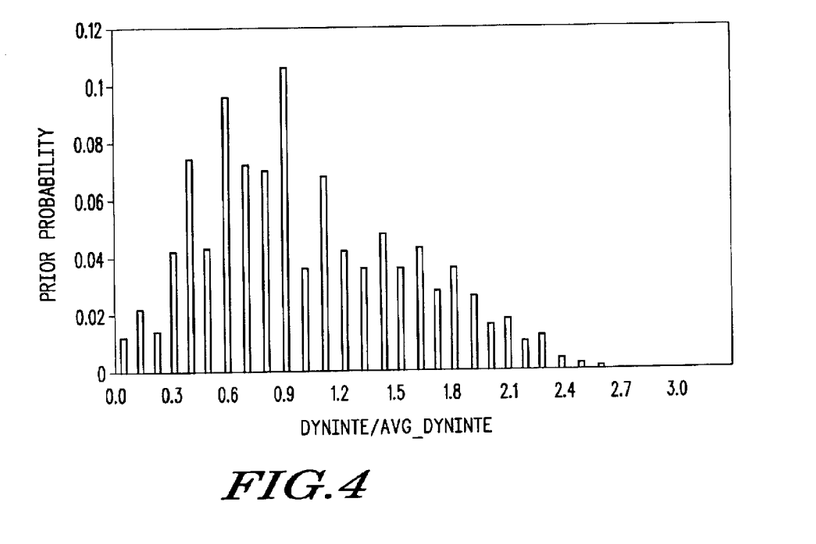
FIG. 4 is a graph showing a statistical distribution of internal switching energy of the circuit of FIG. 3 useful in understanding the invention.

Power estimation using Bayesian inference involves a number of steps:

Collect statistical distribution of circuit power from randomly generated test vectors as shown in FIG. 4.

Figure 5:
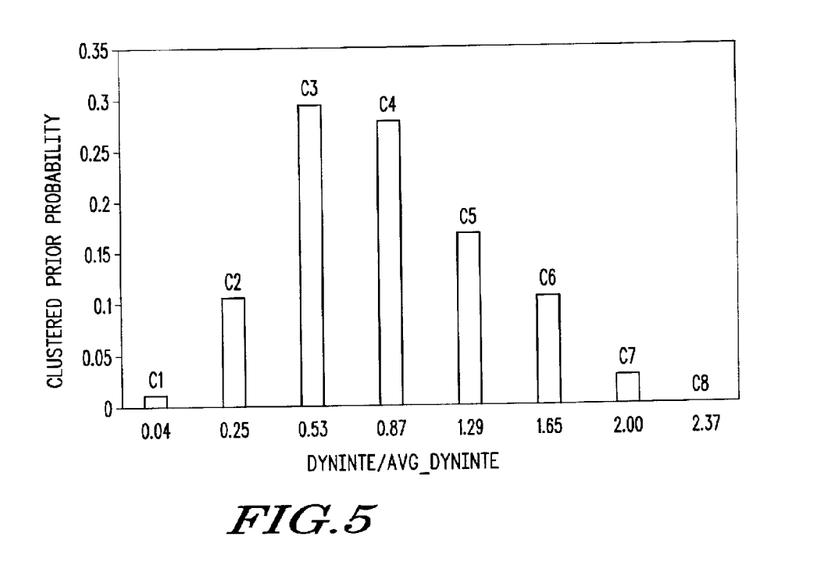
FIG. 5 is a graph showing clustering of the distribution shown in FIG. 4 useful in understanding the invention.

Cluster the statistical distribution into a limited few classes (average values) as shown in FIG. 5.

Extract feature vector x for circuit switching power.

Figure 6:
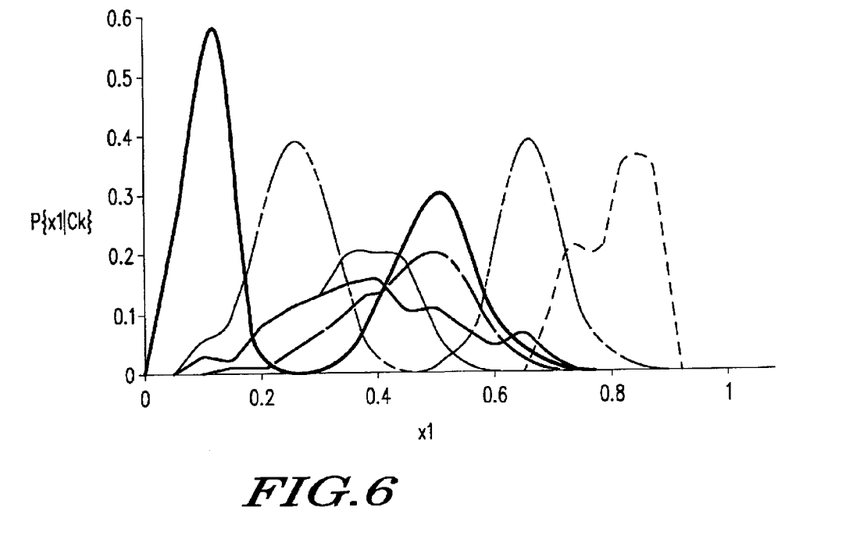
FIG. 6 is a graph of first conditional probability distributions relative to the circuit of FIG. 3 useful in understanding the invention.
Figure 7:
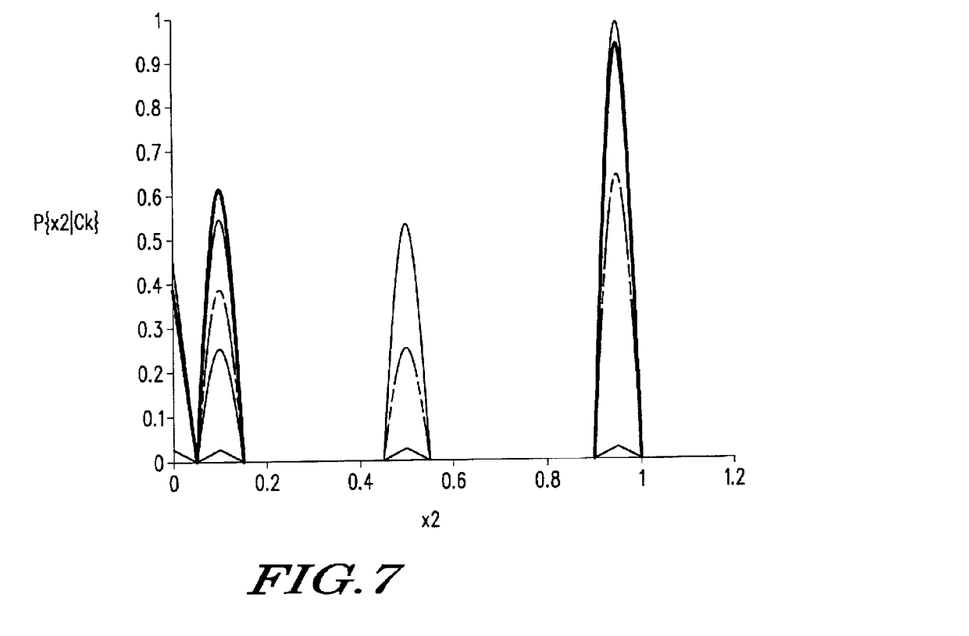
FIG. 7 is a graph of second conditional probability distributions useful in understanding the invention.

Evaluate $P(C_k)$, $P(x|C_k)$ using the clustered statistical distribution information as shown in FIGS. 5–7.

Figure 8:
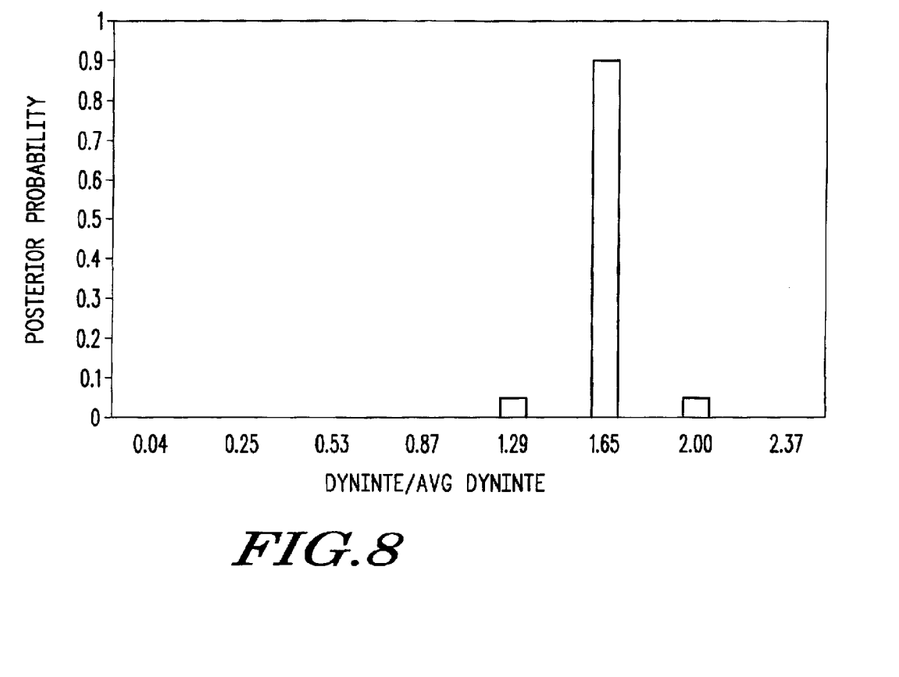
FIG. 8 is a graph of the posterior probabilities of a specific example useful in understanding the invention.

For a transition t in the transition space, use Bayes' theorem to calculate $P(C_k|x)$ as shown in FIG. 8.

Assign an average switching energy value to the transition t based on calculated $P(C_k|x)$.

Feature vector x is extracted by examining the circuit topology and identifying major sources of internal switching energy. There is a need to encode the transition of the primary inputs into key features that represent the major sources of the internal switching energy of the circuit. From the schematic diagram in FIG. 3, there are two major components of the switching energy: the bank of input inverters and the output inverter. The common element is the circuit primitive inverter. The switching activity of the inverter is encoded as: trans(0)=0.0, trans(1)=0.1, trans(r)= 0.5, and trans(f)=1.0. Here, trans(x) is the encoding function. And 0, 1, r, f denotes the four possible transitions (including stationary transitions). The encoded values represent the relative amount of switching energy associated with these 4 possible transitions. Two features are extracted:

$x_1$: input data transition encoding, with encoded value as Σ(inverter encoding of each input inverter)/8.0.

$x_2$: inverter encoding of the output inverter, with the input transition of the output inverter derived from function simulation of the primary input transitions.

In FIG. 8, the data is interpreted as: the transition t is most likely to be mapped into $C_6$, with a small probability to be mapped into $C_5$, $C_7$, and it is very unlikely to be mapped into $C_1$, $C_2$, $C_3$, $C_4$, and $C_8$. Therefore, the average switching energy value represented by $C_6$ can be assigned as the switching energy of the circuit for the transition t.

Bayes' theorem therefore allows the use of statistical information from a set of sample data, as shown in FIGS. 4–7, to evaluate the likelihood of internal switching energy of any possible transitions as shown in FIG. 8. The general techniques of solving the 1-of-c classification problem in the area of neural networks are known to those familiar with neural nets. This is achieved by taking advantage of its underlying mathematical property of Bayesian inference. This property is herein utilized for benefit to address the circuit power estimation problem.

The neural net 30 as shown in FIG. 2 is a feedforward neural net, which is acyclic. Each block of net 30 is called a unit. Each unit has a value and an activation function associated with it. Each graph edge, each arrow linking the blocks, has its own weight. The value of a unit is calculated by its activation function based on the weights of incoming graph edges and the values of units these incoming graph edges are connected to. A neural network needs to be trained and validated before it can be used. The weights in the network are adjusted during network training. Training and validation data are derived from statistical sampling of circuit leakage power and switching energy via SPICE simulation. Commonly used training and validation techniques of neural networks are used in this approach.

Each input unit is associated to a distinctive feature of circuit state/transition. Each output unit is associated to a predefined class of circuit leakage power/switching energy. The number of output units is equal to the number of classes created for the circuit leakage power or switching energy. Each class represents an average power consumption value. The number of hidden units is adjusted to meet the requirements of prediction accuracy and network complexity. The more hidden units there are, the more complex the network is, and the more accurate the solution of the classification problem tends to be. It is known in the art that when logistic sigmoid and/or softmax activation function(s) are used, the values of the output units can be interpreted as posterior probabilities.

The prediction accuracy of the power estimation method described herein largely depends on the quality of the feature extraction for circuit leakage and switching power. A properly selected feature x should produce two or more distinctively identifiable conditional probability distributions $P(x|C_k)$, as those shown in FIGS. 6–7. Neural networks use such conditional probability distributions to make decisions on assigning a state or transition to the right class, and therefore correct average power consumption values. For example, each of the expressions $P(x_1|C_1)$, $P(x_1|C_2)$, $P(x_1|C_6)$, $P(x_1|C_7)$, $P(x_1|C_8)$ are easily distinguished from each other in FIG. 6. The distributions of $P(x_2|C_3)$, $P(x_2|C_4)$, $P(x_2|C_5)$ are different in FIG. 7. The distributions in FIGS. 6 and 7 complement each other in the sense that similar distributions of those classes in FIG. 6 are distinctive in FIG. 7. In practice, multiple features need to work in concert to distinguish all classes.

Feature extraction is performed by encoding the state of a circuit in the case of leakage power estimation, or by encoding the transition of a circuit in the case of switching power estimation. Power statistical distribution of a circuit, states in the clustered leakage power classes, and transitions in the clustered switching power classes are used as references. There are a number of state/transition encoding options:

Encoding of circuit specific features by examining clustered power classes with respect to state, transition, circuit topology, functionality and symmetry. This is the most effective way of finding a good feature. An example is the feature $x_1$ as described previously.

Encoding of common circuit topologies (e.g. NFET stack, PFET stack, etc). Encoding their states/transitions with respect to their power consumption monotonically proved to be another effective way of extracting good features. For example, the transitions of 3 stacked NFET's can be encoded as {count(f)*64.0+count(1)*16.0+count(r)*4.0+count(0)}/192.0. Here, count(x) denotes the number of NFET's whose gate has an x transition.

Encoding of common circuit primitives (e.g. inverter, buffer, xor2, xnor2, etc). An example is the inverter transition encoding as described previously.

Functional simulation of circuit internal nodes' states/ transitions. This is useful for encoding the power consumption of internal gates of a circuit. For example, in the m×8 example described herein, the transitions of the primary input of the output inverter are simulated, and then its power consumption is encoded as feature $x_2$.

Direct bit encoding of state and transition. The state/ transition of one or more bits of the primary inputs of a circuit can be selectively encoded, and the neural network can learn the dependency between power consumption and the state/transition of these bits during network training. In a majority of the cases, direct bit encoding alone is not sufficient. It is more useful as a complement, fine tuning the prediction accuracy of the other features, as well as capturing circuit specific dependencies between power consumption and layout.

Based on statistical distribution of circuit leakage power and switching energy, the entire state and transition space of a specific circuit are classified using neural networks into a limited few classes that represent different power consumption average values. This technique enables efficient table-lookup of circuit power of the entire state and transition space. Although this method is described as involving gathering statistical information, clustering power consumption values, feature extraction for neural networks of circuit leakage and switching energy, construction and training of neural networks, and table-lookup of circuit leakage and switching power using the constructed neural networks, only the claims define the scope of the invention. Experimental results on a wide range of circuit topologies demonstrated the robustness of the proposed method for estimating circuit leakage power and switching energy cycle-by-cycle. Thus the entire space of possibilities is covered by this approach but does not require fully enumerating the entire circuit in the model. Fully enumerating a circuit using a transistor model in which the number of possible inputs is in the hundreds of millions would take an impossibly long time, measured in years, but even a week would be too long. With the trained neural net, however, the circuit is fully modeled.

Although the present invention has been described in the context of estimating power consumption, a neural net may also be used to model another circuit characteristic or behavior along the lines described herein. In the present invention, a neural net is trained by input data to determine probabilities for discrete clusters for new inputs. An alternative is to apply input data to a neural net to determine a function. In such case, the function, as modeled by the neural net, would be applied to new data to determine the output.

What is claimed is:

1. A method for modeling a behavior of an electrical circuit, comprising:
forming a trained neural network which models the behavior of the electrical circuit, wherein the behavior of the electrical circuit comprises power consumption of the electrical circuit.

2. A method as in claim 1, comprising:
statistically covering an entire space for the behavior of the electrical circuit.

3. A method as in claim 2, wherein fully enumerating coverage of the entire space would require more than a predetermined computation time.

4. A method as in claim 3, wherein the predetermined computation time is one week.

5. A method as in claim 1, wherein the power consumption of the electrical circuit comprises leakage power of the electrical circuit and switching energy of the electrical circuit.

6. A method as in claim 1, comprising:
using the trained neural network to form a profile of current versus time for the electrical circuit.

7. A method as in claim 1, further comprising:
using the trained neural network to provide input data to a second neural network to form a second trained neural network, wherein the second trained neural network models the behavior of a second circuit, and wherein the second circuit comprises the electrical circuit and other circuitry.

8. A method as in claim 1, wherein the step of forming the trained neural network comprises:
using a non-neural network model of the electrical circuit to generate input data for neural network training.

9. A method as in claim 8, wherein the step of forming the trained neural network further comprises:
using the input data to train a neural network to produce the trained neural network.

10. A method as in claim 8, further comprising:
using the input data to train a second neural network.

11. A method for fully modeling a behavior of at least a portion of an electrical circuit, comprising:
selectively modeling the behavior of a portion of the electrical circuit in order to generate a first plurality of cluster values for the behavior of the portion of the electrical circuit:
training a first neural network to form a first trained neural network;
generating a first plurality of cluster probabilities using the first trained neural network; and
using the first plurality or duster probabilities and the first plurality of cluster values, fully modeling the behavior of the portion of the electrical circuit wherein the behavior of the electrical circuit comprises power consumption of the electrical circuit.

12. A method as in claim 11, wherein the power consumption comprise leakage power and switching energy.

13. A method as in claim 11, further comprising:
using the trained neural network to form a profile of current versus time for the portion of the electrical circuit.

14. A method as in claim 11, further comprising:
selectively modeling the behavior of the portion of the electrical circuit to produce input data for a higher level of modeling;
using the input data to generate a second plurality of cluster values for the behavior of the electrical circuit;
training a second neural network to form a second trained neural network;
generating a second plurality of cluster probabilities using the second neural network; and
using the second plurality of cluster probabilities and the second plurality of cluster values, fully nodding the behavior of the electrical circuit.

15. A method as in claim 11, further comprising:
performing feature extraction on inputs to the first neural network and on inputs to the first trained neural network.

16. A method for modeling power consumption behavior of an electrical circuit, comprising:
generating a plurality of cluster power values for the electrical circuit;
training a neural network to form a trained neural network;
generating a plurality of cluster probabilities using the trained neural network; and
using the plurality of cluster probabilities and the plurality of cluster values, modeling the behavior of the electrical circuit, wherein the behavior of the electrical circuit comprises power consumption of the electrical circuit.

17. A method as in claim 16, wherein the power consumption behavior of the electrical circuit comprises a leakage power component and a switching energy component.

18. A method as in claim 16, comprising:
using the trained neural network to form a profile of current versus time for the electrical circuit.

* * * * *

UNITED STATES PATENT AND TRADEMARK OFFICE
CERTIFICATE OF CORRECTION

PATENT NO. : 6,910,025 B2 Page 1 of 1
APPLICATION NO. : 09/989325
DATED : November 20, 2001
INVENTOR(S) : Lipeng Cao

It is certified that error appears in the above-identified patent and that said Letters Patent is hereby corrected as shown below:

In Column 7, Line 40, Claim No. 11:

Change "or duster" to --of cluster--

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 6,910,025 B2
APPLICATION NO. : 09/989325
DATED : June 21, 2005
INVENTOR(S) : Lipeng Cao It is certified that error appears in the above-identified patent and that said Letters Patent is hereby corrected as shown below:

In Column 7, Line 40, Claim No. 11:

Change "or duster" to --of cluster--

This certificate supersedes the Certificate of Correction issued May 13, 2008.

Signed and Sealed this

Seventeenth Day of June, 2008

JON W. DUDAS
*Director of the United States Patent and Trademark Office*